US006654948B1

(12) United States Patent
Konuru et al.

(10) Patent No.: US 6,654,948 B1
(45) Date of Patent: Nov. 25, 2003

(54) METHODS AND APPARATUS FOR PARTIAL AND CONSISTENT MONITORING OF OBJECT-ORIENTED PROGRAMS AND SYSTEMS (75) Inventors: Ravi B. Konuru, Tarrytown, NY (US); Olivier Gruber, Jackson Heights, NY (US); Wim De Pauw, Scarborough, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/416,575

(22) Filed: Oct. 12, 1999

(51) Int. Cl.$^7$ .............................. G06F 9/44; G06F 9/46
(52) U.S. Cl. ....................................... 717/127; 709/318
(58) Field of Search .................... 717/127, 124–126, 717/128–135, 101; 709/310, 318; 702/186

(56) References Cited

U.S. PATENT DOCUMENTS

| | | | |
|---|---|---|---|
| 5,590,056 A | * 12/1996 | Barritz ....................... | 702/186 |
| 5,608,908 A | * 3/1997 | Barghouti et al. .......... | 709/318 |
| 5,819,094 A | 10/1998 | Sato et al. ................... | 717/131 |
| 6,405,364 B1 | * 6/2002 | Bowman-Amuah ......... | 717/101 |

FOREIGN PATENT DOCUMENTS

| | | |
|---|---|---|
| GB | 2 258 063 A | 1/1993 |
| WO | WO 00/77643 | 12/2000 |

OTHER PUBLICATIONS

M. Harada et al., "A Structured Object Modeling Method SOMM and Its Environment SOME," Systems and Computers in Japan, vol. 27, No. 11, pp. 1–20, 1996.

Z. Aral et al., "Non–Intrusive and Interactive Profiling in Parasight," Encore Computer Corporation, pp. 21–30, 1988.

S. Liang et al., "Comprehensive Profiling Support in the JAVA™ Virtual Machine," USENIX Association, 5th USENIX Conference on Object–Oriented Technologies and Systems (COOTS '99), pp. 229–240.

* cited by examiner

*Primary Examiner*—Hoang-Vu Antony Nguyen-Ba
(74) *Attorney, Agent, or Firm*—Douglas W. Cameron; Ryan, Mason & Lewis, LLP (57) ABSTRACT

A technique for monitoring events generated by an object-oriented system comprises the steps/operations of: (i) monitoring events which describe executed operations associated with the object-oriented system; and (ii) applying one or more sequencing rules when reporting a subset of the monitored events, the one or more sequencing rules substantially ensuring consistent reporting of the subset of monitored events. Preferably, monitoring continues when event reporting is at least partially disabled. Further, the monitoring step/operation may include dividing the monitored events into categories. One category may include entity events, an entity event defining an existence status of a given event. Another category may include activity events, an activity event defining an operation associated with a given event. Still further, the entity events and activity events may be further divided into at least one of an object event category, an execution event category, a type event category and a synchronization event category. The sequencing rules are applied to maintain substantial consistency with respect to information associated with the categories.

26 Claims, 4 Drawing Sheets

FIG. 1

FIG. 2
PROGRAM VIEW

● : OBJECT CREATION
○ : OBJECT RECLAMATION
OBJ1: OBJECT OF CLASS TYPE $C_1$
OBJ5: OBJECT OF CLASS TYPE $C_2$ ($C_2$ DERIVED CLASS OF $C_1$)

METHODS AND APPARATUS FOR PARTIAL AND CONSISTENT MONITORING OF OBJECT-ORIENTED PROGRAMS AND SYSTEMS

FIELD OF THE INVENTION

The present invention generally relates to computer programming and, in particular, to monitoring object-oriented programs.

BACKGROUND OF THE INVENTION

Monitoring is that activity where a program execution environment reports to external listener subsystems what is happening during the program execution. Monitoring enables many different tools for performing! different tasks. Examples of such tools are profiling tools for performance enhancements, tracing tools for program understanding, or debugger tools for debugging. Monitoring is generally costly because: (i) amount of information produced is fairly large; (ii) the overhead of monitoring is high; or (iii) a combination of both. Consequently, many systems support partial monitoring where only a subset of the information is produced. There are many different ways for expressing which subset is of interest. However, no matter what conventional method is used to partially monitor a system, the resulting partial monitoring can result in the generation of an inconsistent subset of the complete information. Such an inconsistent subset of information can lead to incorrect interpretation of the program execution behavior by the various information processing tools and lead to erroneous conclusions.

As a result, there exists a need for partial monitoring methods and apparatus which, when incorporated into a program execution environment, result in the generation of consistent information regarding program execution without limiting the possible kinds of information filtering criteria. Accordingly, the consistent information so produced could be used by tools such as, for example, program analyzers or program visualizers to correctly interpret the program execution and solve performance, program understanding and correctness problems.

SUMMARY OF THE INVENTION

The present invention provides methods and apparatus for partial monitoring which, when incorporated into a program execution environment, result in the generation of consistent information regarding program execution without limiting the possible kinds of information filtering criteria.

In one aspect of the invention, a method of monitoring events generated by an object-oriented system comprises the steps of: (i) monitoring events which describe executed operations associated with the object-oriented system; and (ii) applying one or more sequencing rules when reporting a subset of the monitored events, the one or more sequencing rules substantially ensuring consistent reporting of the subset of monitored events. Preferably, monitoring continues when event reporting is at least partially disabled. Further, the monitoring step may include dividing the monitored events into categories. One category may include entity events, an entity event defining an existence status (e.g., object creation, object reclamation, etc.) of a given event. Another category may include activity events, an activity event defining an operation associated with a given event. Still further, the entity events and activity events may be further divided into at least one of an object event category, an execution event category, a type event category and a synchronization event category. The sequencing rules are applied to maintain substantial consistency with respect to information associated with the categories.

In one embodiment, the sequencing rules may specify that: (i) an entity event reporting creation of an entity precede an event reporting reclamation of the entity; (ii) an activity event referring to an entity appear between respective entity events reporting creation and reclamation of the entity; (iii) an entity is not reclaimed without reporting its reclamation; (iv) an invocation is not reported without its associated parent being reported; and (v) synchronization events maintain correct semantics.

Advantageously, the methodologies of the invention may produce substantially consistent information in the context of partial reporting (i.e., reporting a subset of the events being monitored) with respect to a program being executed by the object-oriented system. Selection of the subset of information to be reported may be made using either dynamic or static filtering criteria. The information may be used by tools such as, for example, program analyzers or program visualizers to correctly interpret the program execution and solve performance, program understanding and correctness problems.

It is to be appreciated that the term "partial monitoring" as used in accordance with the invention may be thought of as referring to the perspective of the external listener (e.g., tool). That is, while a subset of the monitored events are reported to the listener in accordance with the one or more sequencing rules, the methodology of the present invention preferably monitors substantially all events associated with the object-oriented system. However, due to the subset reporting, it appears to the external listener that the listener is partially monitoring the object-oriented system. As mentioned, one advantage over the prior art is that the sequencing rules substantially ensure consistent reporting of the subset of monitored events.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
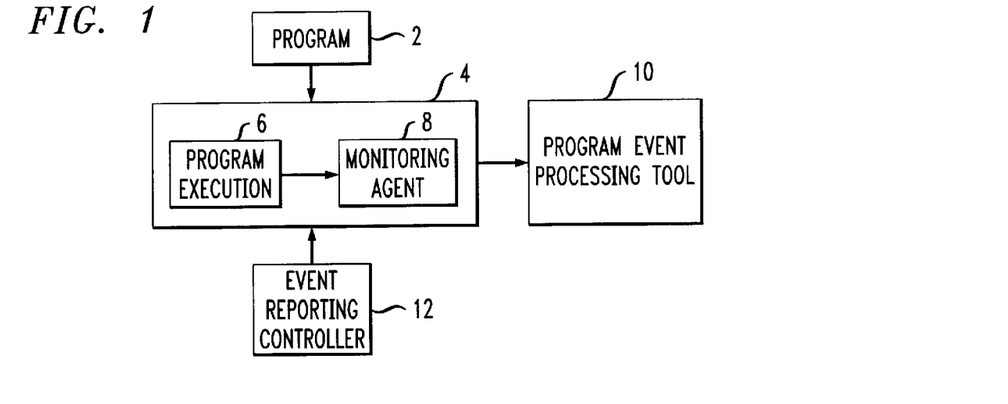
FIG. 1 is a block diagram illustrating an illustrative program execution and event monitoring system in which the invention may be employed.

As mentioned, monitoring is that activity where a running system reports to external listeners what is happening inside the system. A system usually reports its activity through events. Depending on the object-oriented system that is considered, these events can be different in nature. For example, a program execution environment can report events related to the execution of the program. The events reported can be read accesses to data structures, write accesses to data structures, the beginning of execution of a method, the end of execution of a method, etc. A high-level block diagram illustrating the context of the invention is shown in FIG. 1. As shown, a program 2 is executed within a program execution environment 4. The environment 4 includes a program execution subsystem 6 and an integrated monitoring subsystem (agent) 8. The program execution subsystem 6 feeds the monitoring agent 8 different types of events and event information regarding program execution. The monitoring agent portion of the program execution environment reports events in a form that is readable and understandable by external listener subsystems such as, for example, program event processing tools 10. The event reporting may be controlled by an event reporting controller 12. That is, the controller 12 directs the monitoring agent 8 what to report and whether to report (i.e., reporting on) or not report (i.e., reporting off) information to the processing tool 10. It is to be appreciated that this invention deals with particular methodologies of developing and providing such an integrated monitoring subsystem.

Each system designer decides what monitoring capabilities needs to be included in a system. Because monitoring is usually very expensive, many systems provide some ways of subsetting the reported events as users see fit. This encompasses many well-known subsets. For instance, this includes start-stop tracing where the monitoring is stopped and then later resumed. The starts and stops may be user-driven or they can be timer driven (sampling). Partial monitoring also includes more advanced filtering where only some events are generated based on some filtering criteria such as events related to a particular event type or component.

If partial monitoring allows to cut the monitoring overhead to a practical level in most cases, it also makes it likely, when using conventional partial monitoring techniques, to introduce inconsistencies in the reported event stream. To understand how such inconsistencies may be introduced, one needs to gain a basic understanding what we mean by an object-oriented system in the context of programming languages. A class or type is the building block of an object-oriented language and is a template that describes the data and behavior associated with instances of that class. When one instantiates a class, an object that is created looks and feels like other instances of the same class. The data associated with a class or an object is stored in member variables. The behavior associated with a class or object is implemented with methods. For example, a rectangle can be considered a class that has two attributes or member variables: length and breadth, and a method named area. From this rectangle class, one can create or instantiate new instances or new rectangle objects. These new objects share similar behavior with respect to the attributes and methods that can be invoked on them. However, the actual values of the attributes and the value returned by the methods can be different. Method invocations are executed in the context of a thread of execution.

During the execution of an object-oriented program, potentially many objects are created, manipulated, and returned to system storage when they are no longer needed. This return to system storage can be automatic or through an explicit return-to-storage operation by the program. We refer herein to both types of return as reclaiming or reclamation.

An object-oriented program achieves its task by potentially creating many objects of different classes and invoking methods on them.

Figure 2:
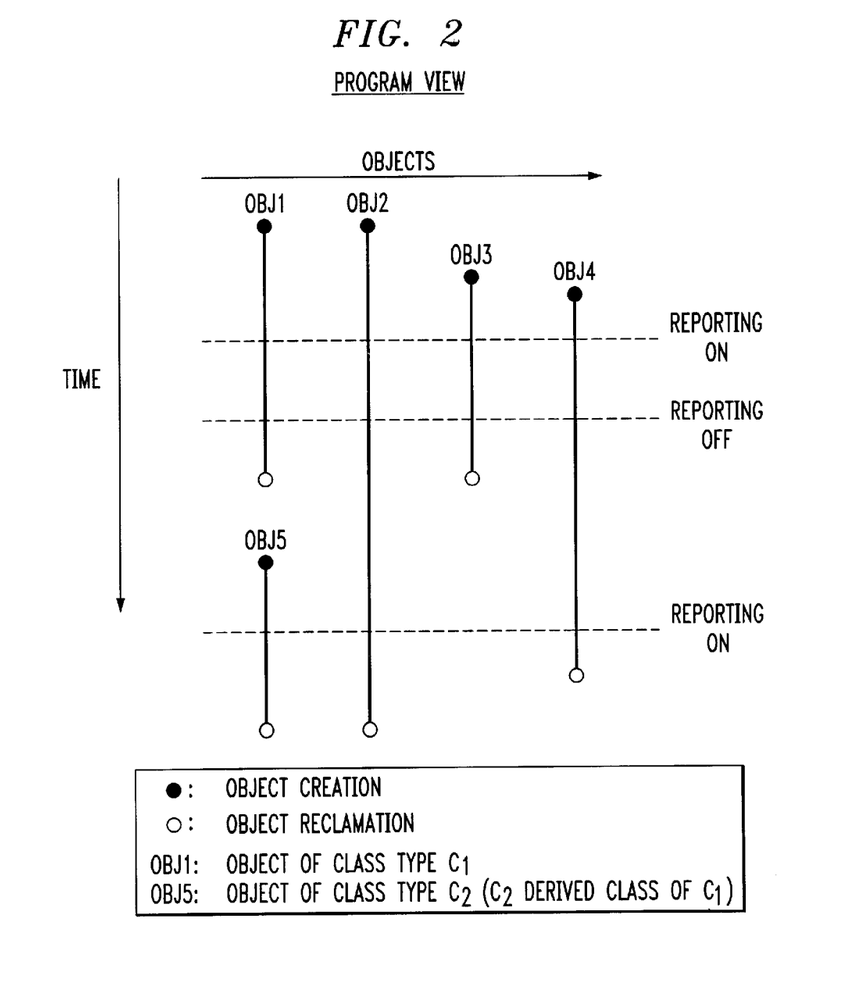
FIG. 2 is a visual representation illustrating object-oriented program execution through time.

Consider a visual representation of an object-oriented program execution through time as shown in FIG. 2. For the sake of discussion, let us assume that the identity of objects is nothing but the memory address to which they have been allocated. During its execution, the program creates 5 objects, OBJ1 through OBJ5, and invokes methods on these objects. However, OBJ1 and OBJ5 have the same identity since OBJ5 is allocated at the same address as OBJ1 after OBJ1 has been reclaimed. Since reporting was turned off during the time the OBJ1 was reclaimed and OBJ5 was created, a program understanding tool can read the monitoring events generated by a conventional monitoring system and mistakenly associate the costs and method invocations to the wrong objects. The consequence is that tools have to shield themselves from these inconsistencies, either by ignoring them and presenting potentially erroneous results or by implementing costly detection and prevention mechanisms.

The present invention provides an automated methodology for avoiding inconsistencies, while not limiting filtering mechanisms of partial monitoring. The invention is applicable to any system implementing some form of monitoring. The invention will be explained in the context of a monitoring API (application programming interface) relying on events to report internal activity to external listener subsystems. However, the invention is not so limited. That is, the invention may also, for example, apply to the internal design of systems that embed one or more kinds of listener subsystems.

The present invention dictates consistency rules regarding the generation of events; but not necessarily which events should be generated and not what kind of partial monitoring is permissible. A basic requirement is that any generated event belong to one and only one of the two following categories: (i) entity events; and (ii) activity events.

Entity events are defined as events which report the creation/existence of an entity in the system as well as its death/reclamation. Activity events are defined as events which, on the contrary, only report that something is happening on one or more existing entities, that is, no entity creation or reclamation is involved.

For instance, an event reporting the creation of an object is an entity event. An event reporting the invocation of a method on an object is also an entity event, for a stack frame has been created. However, an event reporting that an object has been moved in memory or that an object reference has been assigned to another object is an activity event.

It is also important to notice that, because we assume a programmatic monitoring API, entity events have to introduce an identity for the created entities, called the monitoring identity. The rationale for the identity is to allow other events to be able to refer to entities. For instance, an event reporting a method invocation needs to refer to the receiver object, the class implementing the method, and possibly even the thread on which the invocation occurs. Without monitoring identity, this would be impossible.

One advantage of this invention is that it works with no globally unique identity schemes. Such schemes are expensive to implement and most system designers prefer using "scoped" identity such as the memory address at which the entity has been allocated. By "scoped," we mean that the identity is only valid from the time the entity is created to the time it is reclaimed. The consequence is that the mapping between an entity and its identity is time-scoped. Our only requirement is that entity events always report changes in the mapping.

To further explain what we mean by object-oriented monitoring through events, let us define in abstract terms the concepts and events of a very typical object-oriented system. This definition applies to substantially any existing object-oriented system. However, it is to be appreciated that the invention is not intended to be limited by this abstract definition. An object-oriented system presents four basic entities: (i) type; (ii) object; (iii) thread; and (iv) invocation. A type describes an object structure and specifies its behavior, i.e., the set of methods one may invoke on an object of that type. An invocation is the execution of a method on its receiver object. Each invocation is carried on one and only one thread. Invocations nest, forming the thread execution stack.

Typically, such a system would have entity events to report the creation and reclamation of these entities. For instance, events reporting the creation and reclamation of an object or a thread, events for reporting the loading and unloading of a type, and/or events for reporting the beginning or end of an invocation. These events may represent the core monitoring. That core would then typically be extended with extra activity events such as an event reporting that a thread is suspended or resumed. Other events may be used to report object management activities such as compaction, probably yielding new monitoring identities for objects. Synchronization events, reporting the "enters" (entries) and "leaves" (departures) from a critical section, as well as potential waits, would also be examples of activity events. A critical section is a set of program instructions that need to be executed as a unit with respect to the data structures they manipulate. In a system having a single "thread" of execution, achieving a critical section is trivial. But in modern systems, many threads of execution are concurrently executed to improve functionality and processing time. It is quite possible these threads need to access and manipulate shared data structures. To maintain consistency, a lock structure is associated with the shared data and a thread performs the operations in a critical section only after gaining ownership to the lock. Once the operations are completed, the thread releases the ownership of the lock. If it happens that another thread has lock ownership, then a thread desiring to acquire the lock waits on the owning thread until the lock is free. A diagram showing the different threads in a system with arrows drawn from a thread waiting for a resource to the thread owning the resource is called a wait graph. Such a wait graph, with accurate information and some additional summary information, is an excellent tool for determining sources of contention and reasons for infinite waiting of threads for resources.

In the presence of partial monitoring, inconsistencies in the above abstract system may appear under four major forms: (i) type inconsistencies; (ii) object inconsistencies; (iii) execution inconsistencies; and (iv) synchronization inconsistencies.

Type inconsistencies may exist when types are confused because the correspondence between types and their identifier is not maintained accurately. Object inconsistencies may exist when objects are confused because the correspondence between objects (type instances) and their identifier is not maintained accurately. Execution inconsistencies may exist when threads are confused, as well as method invocations, because the correspondence between threads and their identifier is not maintained accurately, as well as when the thread stack nesting of methods is not maintained accurately. Synchronization inconsistencies may exist when the ownership of lock and critical section is confused, as well as the wait graph between threads.

Each of these cases may provoke the erroneous reporting of potentially serious conditions from conventional monitoring tools that support some form of partial monitoring. Such erroneous reporting may include, for example, erroneous profiling information (accounting of times), erroneous object reclamation, erroneous memory leaks, or even false deadlocks. Unfortunately, there exist no comprehensive solutions for these and other problems in the prior art in the area of supporting partial and consistent monitoring for object-oriented systems. In general, the conventional program execution environments leave the burden of making sense of the information generation to the information processing tools. In the context of Java language (see, e.g., "Java Language Specification," J Gosling, B. Joy and G. Steele, Addison Wesley, ISBN 0201634511 (1996); and "Java 1.1 Developer's Handbook," P. Heller, S. Roberts, with P. Seymour and T. McGinn, Sybex, ISBN 0-7821-1919-0), the Java Virtual Machine (JVM) from Sun Microsystems exports an API called JVMPI (see, e.g.,"Comprehensive profiling support in the Java Virtual Machine," Sheng Liang and Deepa Viswanathan. Usenix Conference on Object-Oriented Technologies (COOTS) 1999) that allows for callbacks into the JVM to handle certain inconsistencies related to the type system. However, it is known to be incomplete. In particular, the trace generation can be incorrect in the presence of garbage collection. In the context of the C language, some work has been done in the context of a tool named Parasight (see, e.g.,"Non-intrusive and interactive profiling in Parasight," Ziya Aral and Ilya Gemter, Proceedings of the ACM/SIG PLAN PEALS 1988, Parallel Programming: Experience with Applications, Languages and Systems, pages 21–30. July 1988) that provides some support for consistent tracing. However, they do not address the issues due to garbage collection since it does not exist for normal C programs.

In a significant departure over the prior art, the present invention provides methodologies for supporting partial and consistent monitoring of object-oriented programs. These methods, when incorporated in program execution environments, can be used to produce consistent information which can be used by batch and interactive tools such as, for example, program analyzers, visualizers and debuggers for purposes such as program understanding, visualization and debugging.

For the description of this embodiment of the invention, we will assume without loss of generality that a virtual machine (VM) executes the object-oriented system of interest and events occurring as part of the system execution are delivered to external event listeners which have to register to a single event source, exported by the running VM. Notice that the VM does not take care of maintaining any history of generated events. That would be the responsibility of listeners.

The invention provides a monitoring methodology that is composed of two parts: (i) a categorization of events that fully describe the execution of an object-oriented program; and (ii) a set of sequencing rules in order to ensure the consistency of the event stream. These parts will be explained in detail below. Referring back to FIG. 1, it is to be appreciated that this inventive methodology may be implemented by the monitoring agent 8 (also referred to herein as the monitoring system or subsystem) within the program execution environment 4. The object-oriented program would then be program 2 in FIG. 1. The event stream is reported by the monitoring agent 8 to, for example, the program event processing tool 10. Reporting may be controlled by the event reporting controller 12.

Thus, the invention applies to any system that needs to support consistent partial monitoring and whose events can be expressed as belonging to one of the specified event categories.

Categories of Monitoring Events

According to one embodiment of the invention, we group monitoring events into four categories: (i) type events; (ii) object events; (iii) execution events; and (iv) synchronization events.

Type events are the definition of types allowing -to describe objects which are instances of types. A type is either a basic type, a class or an interface. Basic types are the classical ones such as integers, floats, etc. A class has a name, a class it is derived from (called super class), a list of implemented interfaces, a set of methods that it implements, and a set of fields it defines. An interface has a name, a set of interfaces it extends, and a set of methods and constants it declares. A method has a return type, a name, and a list of parameter types (the receiver being implicit and compatible with the class implementing the method). A field has a name and a type.

We define three events on types: create, load, and reclaim. The rationale for three events is further elaborated in the following section (Sequencing Rules). The create event specifies the name of the type and monitoring identity. The load event defines the type. It refers to the super class and to the implemented interfaces. It also includes the description of the class members, that is, the methods and the fields. Method descriptions refer to the return and parameter types. Field description refers to the field type. The reclaim event indicates the type is no longer known to the monitored system.

Object events report the life cycle of objects (creation, destruction) as well as the object graph, that is, references between objects. Objects are created upon explicit request and later reclaimed. Whenever an object is allocated, a create event is generated; whenever an object is reclaimed, a reclaim event is generated. The create event includes the monitoring identity of the created object and refers to the class of the object. The reclaim event just refers to the reclaimed object.

A reference identifies at runtime an object and allows an object A to refer to an object B. A reference event reports the existence of a reference from a pointing-to object to a pointed-to object (potentially identical). A reference event refers to the field (and may also refer to its declaring class) containing the reference and to the referred-to object.

Execution events report the procedural aspect of the monitored system, although retaining its object-oriented characteristics. First of all, two events report the creation and destruction of a thread. The create event provides the thread name and its monitoring identity. The destruction event just refers to the reclaimed thread. A renaming event is also provided allowing to keep track of name changes.

A thread executes method invocations following a Last-In-First-Out (LIFO) model. In other words, if a thread executes a method A that invokes another method B, then the LIFO model states the execution of method B completes before the execution of method A. It can be said that method A is the parent of method B. A method invocation represents the execution of the method instructions. Two events are used to report method invocation: an enter and a leave event. The enter event refers to the thread, the class implementing the currently executing method, and the receiver object. The leave event only refers to the thread. This is sufficient because of the LIFO model.

Synchronization events report the activity regarding critical sections and locks. Many different synchronization semantics exist and are used by different systems or even sometimes combined. However, most synchronization mechanisms ultimately rely on locks. A thread may acquire a lock, release it if it owns it, or be suspended awaiting for the lock to become available. Often, locks are associated with objects. We define four events: acquire, release, begin-wait and end-wait. All synchronization events refer to the involved thread and the associated object, if applicable.

Sequencing Rules

Events have to be sequenced in a certain way so to ensure that the reported event stream is consistent. We first assume full reporting in this section, that is, each listener is sent all events and in the same order; Then we will consider partial reporting.

When full reporting is assumed, there are only two fundamental sequencing rules:
1. The entity event reporting the creation of an entity must precede the event reporting its reclamation (death).
2. Any activity events referring to an entity must appear between the entity events reporting the creation and reclamation of that entity.

Although these two rules seem very intuitive, their enforcement is tricky in some cases. We explained earlier that we define three events for types: the create, load, and reclaim events. The rationale is a sequencing one. Type definitions are by definition recursive and potentially cyclic. This suggests to separate the definition of a type from its mere existence so to be able to break cyclic dependencies in type definitions. The create event must precede the load event which must precede the reclaim event. Any other event referring to a class must appear after the load event for that class. For certain languages, maintaining such a precedence invariant in the VM can be tricky. For instance, consider the static initializer feature in the Java language. Static initializers are snippets of code which initialize class static fields at load time. Care must be taken to issue the class load event before any static initializer is run, otherwise the sequencing rules would be violated, having events such as enter and leave events referring to a non-loaded class.

Consider the more interesting case of partial reporting. In this context, listeners are allowed to get only a partial view of the running system. Many different ways have been designed to specify which partial view. Some of the partial reporting options that can be provided include: (i) listen only to one kind of events (type, execution, object, or synchronization); (ii) filtering events on a thread basis; and (iii) suspend and resume monitoring, globally or selectively per thread.

In the event of partial reporting, the previous sequencing rules are not enough to ensure consistency. The following three rules must be added to the above two rules:
3. No defined entity may be reclaimed without its reclamation being reported.
4. No invocation may be reported without its parent being reported.
5. The four synchronization events (acquire, release, begin-wait, end-wait) must always exhibit a well-formed sequence.

These rules have to be maintained by the running system as do the first two sequencing rules. However, it is important to notice that even though reporting has been totally or partially turned off, maintaining these rules remains a requirement. In other words, monitoring is never turned off as a subsystem, it may only not report anything.

The third consistency rule (3. above) is not surprising and quite obviously complements the normal sequencing rules. It states that if an entity has been defined, then its reclamation must be reported to. The rationale is to allow listeners to maintain accurate mapping between monitoring identities and entities. See an example of such inconsistencies below. Full reporting status is assumed at the beginning of the example.

Step (1) Class C1 is created with id #12
Step (2) Class C1 is loaded, has methods M1 (id #23 and M2 #24)
Step (3) Object O1 (id #34) of Class C1 is created
Step (4) Invocation of method M1 on O1
Step (5) The user turns monitoring off
Step (6) Object O1 is reclaimed (id #34 is freed for reuse)
Step (7) Object O2 (id #34 is reused) of class C1
Step (8) The user turns tracing back on . . .
Step (9) Invocation of method M1 on O2 is executed In step (9), the listeners will mistake O2 for O1 because the freeing and reuse of the monitoring identifier #34 was not reported. Such Object inconsistencies can result in execution information that is incorrect, but most conventional visualizers will display the information as if it is correct, misleading the end users.

The fourth consistency rule (4. above) is a little more tricky. Before explaining it, let us state first that the third rule ensures that leave events are reported for any reported enter event when reporting is turned off regarding invocation events. This is, however, not enough. Consider the following scenario. While a thread is running, the execution reporting is turned off. As a result, from the third rule, leave events will be generated as currently on the stack invocations will return.. While the reporting is turned off, many invocations take place which are not reported. When reporting is turned back on, the thread stack is not empty, hence, before reporting the next enter event, the runtime system has to recursively report all unreported enter events for all the currently executing invocations on the thread stack.

The fifth consistency rule (5. above) is one example of the necessary consistency on activity events. Although synchronization events are not entity events and therefore there is no risk of mistaking entities, it is still necessary to maintain correct semantics. This is what we mean by well-formed sequence of acquire, release, begin-wait and end-wait events.

The essence of the rationale for applying the rules for partial monitoring consistency is to maintain the monitoring subsystem as active even when reporting is suspending. The result is that some events may be reported even though listeners have expressed that they didn't want them. Also, this may result in missed events to be reported late. Although this may at first seem counterproductive in light of partial monitoring, this is not the case. By experience, the spurious events are not many, especially comparing to the amount of events avoided while the partial tracing option is on.

For instance, let us suppose that one expresses no more interest in execution events. In the worst case, all currently executing methods will generate spurious leave events. But comparing this to the number of enter/leave event pairs that would be generated even in ten seconds of execution time on an average machine, this is negligible. While, for object events, more events may be generated, partial monitoring still proves productive.

Figure 5:
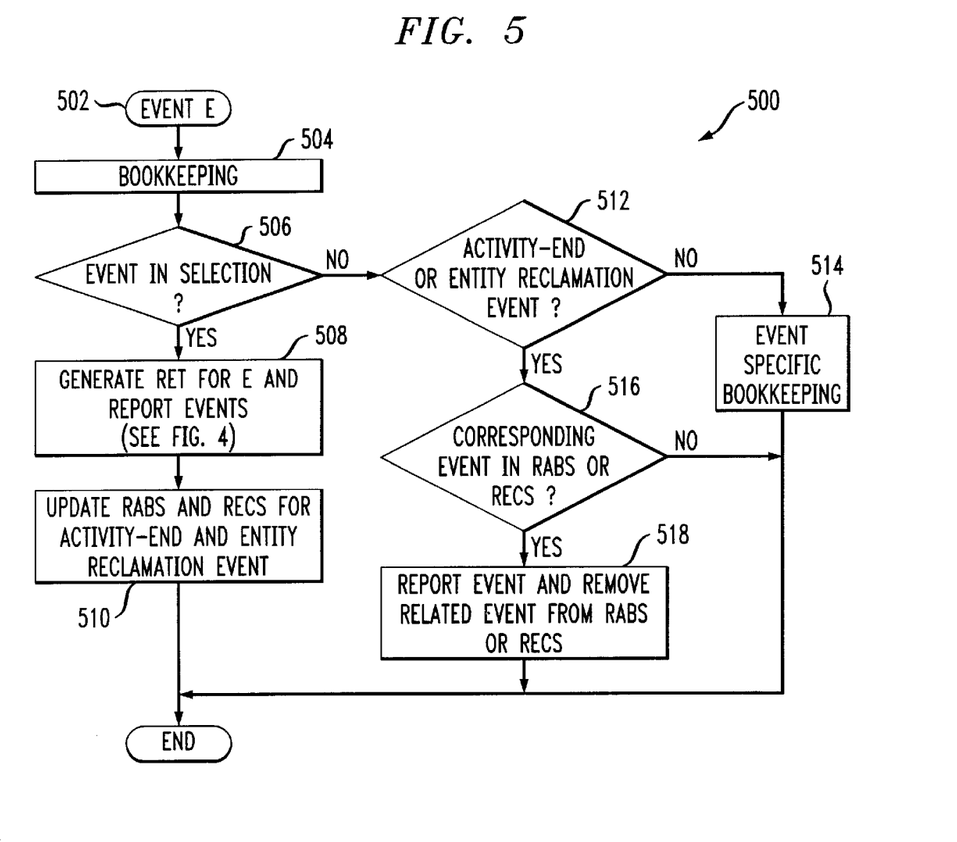
FIG. 5 is a flow diagram illustrating a consistent monitoring methodology according to one embodiment of the invention.

To further facilitate a better understanding of this invention, we now describe a generic operative form of this invention. The related flow diagram for the generic algorithm is shown in FIG. 5. But before explaining FIG. 5, the following terms, concepts and data structures need to be understood in this context: Selection; Bookkeeping; Event-Specific Bookkeeping; Reported Activity-Begin Set; Reported Entity-Creation Set; Prerequisite Event Set; Identity Event Set; and Report Event tree.

Selection: An event is in selection if the current filtering criteria are such that the event needs to be reported. For example, all object creation events are in selection if the user specified all object-life cycle events as the filtration criteria.

Bookkeeping: This generic name is used to cover operations that have a notion of summary associated with them. For example, a counter for the number of class-creation events may need to be incremented even if the specific class object in the class-creation event is not in the current selection.

Event-specific Bookkeeping: This generic name is used to describe the operations that need to be performed for a specific event when it is not in the current selection. For instance, if method-enter event is not in the current selection, the monitoring system may record the time at which the enter occurred so that it can report the correct elapsed time of a method in case the method becomes part of the selection before the method-leave event occurs.

Reported Activity-Begin Set (RABS): This is the subset of activity events that have occurred on entities that are currently live. The subset includes only those events that can be categorized as activity-begin events. For instance, for method events, it could be a method-enter event. For synchronization related events, it could be an acquire event or a begin-wait event.

Reported Entity Creation Set (RECS): This is the subset of all the entities that are currently live and have been reported by the monitoring system to external listener subsystems. For instance, if the creation of a class C has been reported, then it becomes a member of this set. If the class C is reclaimed it is removed from this set.

Prerequisite Event Set (PES): Each event that can be generated by a monitoring system has a prerequisite event set. For an event E, this is the set of events that need to be reported before the event E can be reported. Such a set is constructed by applying the sequencing rules to the Event. For instance, for a method-enter event, the sequencing rules may specify the thread executing the method, the object on which the method is being executed, and the method itself. Only then can the method-enter event be generated. Thus, an Unreported Prerequisite Event Set (VPES) consists of events from PES that have not yet been reported.

Identity Event Set (IES): This is a special kind of an event set that is defined to handle certain technical problems in reporting events. In certain languages, it is possible to have cycles in the type system. In other words, to completely define a type A, one may eventually need to define a type B that in turn requires the definition of type A. In such a scenario, it is not possible to order the reporting of the definitions of type A and B. To break this cycle, we introduce the notion of an "identity event" for a type which can contain information about its identity and all other information excluding those parts that require knowledge of other types. For the above example, the identity event can contain identity of class A, the name of the class, and may be the location of the file from which the class definition was loaded into the execution environment. For a type A, this is the set of identity events that need to be reported before the type can be defined. An Unreported Identity Event Set (UIES) for an event is the subset of IES information that has not yet been reported.

Figure 3:
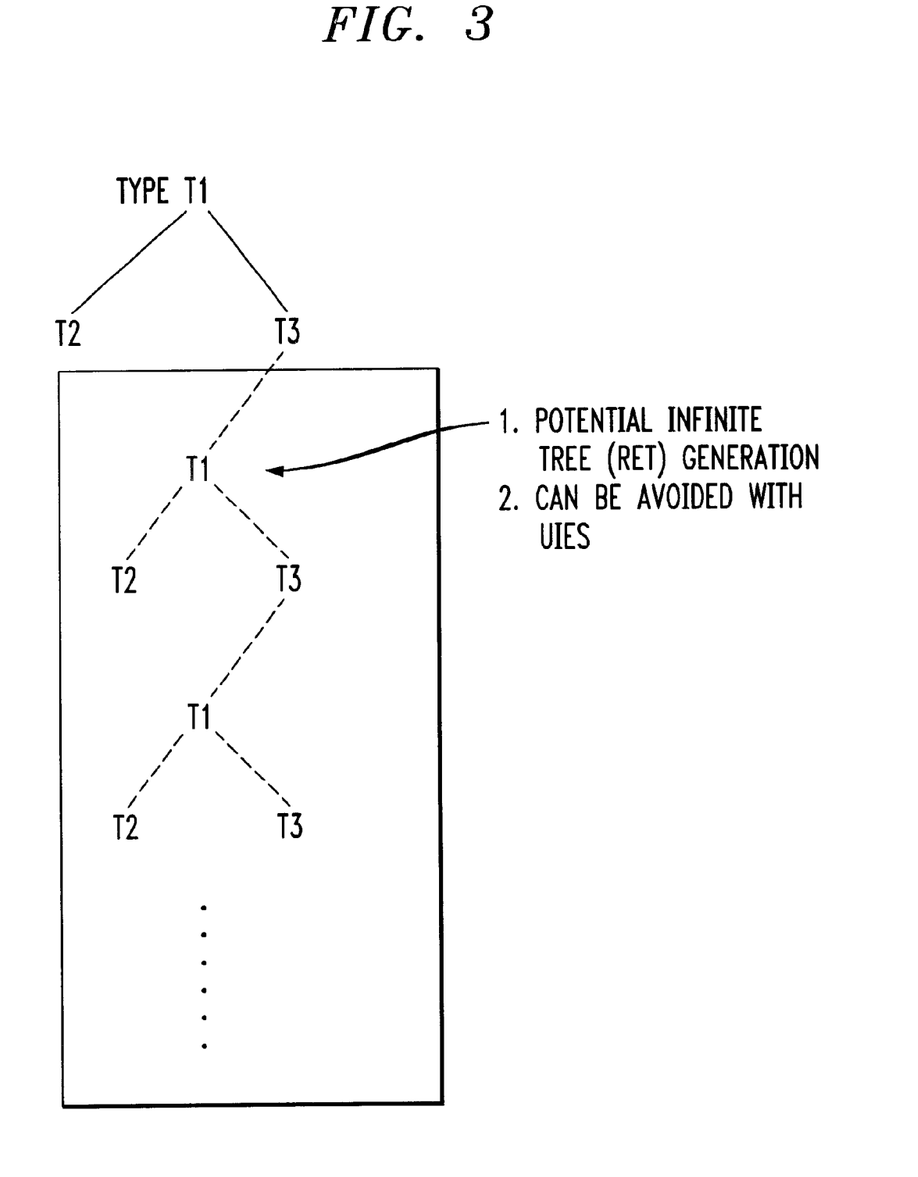
FIG. 3 is a diagram illustrating potential infinite tree generation.

Report Event Tree (RET): Conceptually, there is one such tree for each event that can be generated by a monitoring agent. For an event E, the root of this tree is the event itself and the children are the elements of its UPES. The UPES can be calculated by subtracting RABS and RECS from PES. The complete report tree can be generated by repeatedly adding the elements of the UPES of the children events. However, as mentioned earlier, it is possible in some languages to have cycles in the type system. If the rule of adding the elements of UPES is blindly applied, then the generation process will never terminate. For example, consider a type T1 with types T2 and T3 in its UPES. Also, assume that for type T3, T1 is in its UPES. The partially generated RET for a type T1 is shown in FIG. 3. The children (the elements of its UPES) of T1 are T2 and T3. However, T1 is a member of T3's UPES. If we blindly apply the generation rule, it would result in an infinite tree.

So we add a related set and another condition to the RET generation. Every RET has an associated UIES that contains the identity events for the entity events in the tree. The UIES is updated before an entity event is added to the RET. Further, we forbid adding those elements of UPES for an event to the RET whose identity event is already contained in the UIES. Let us see how this applies to the above example. At the point where the generation rule is being applied to T3, UIES contains (T1, T2). Now, T1 cannot be added to the RET as a child of T3 since it is already present in the UIES. Thus, this set and the additional condition stop the generation process.

Figure 4:
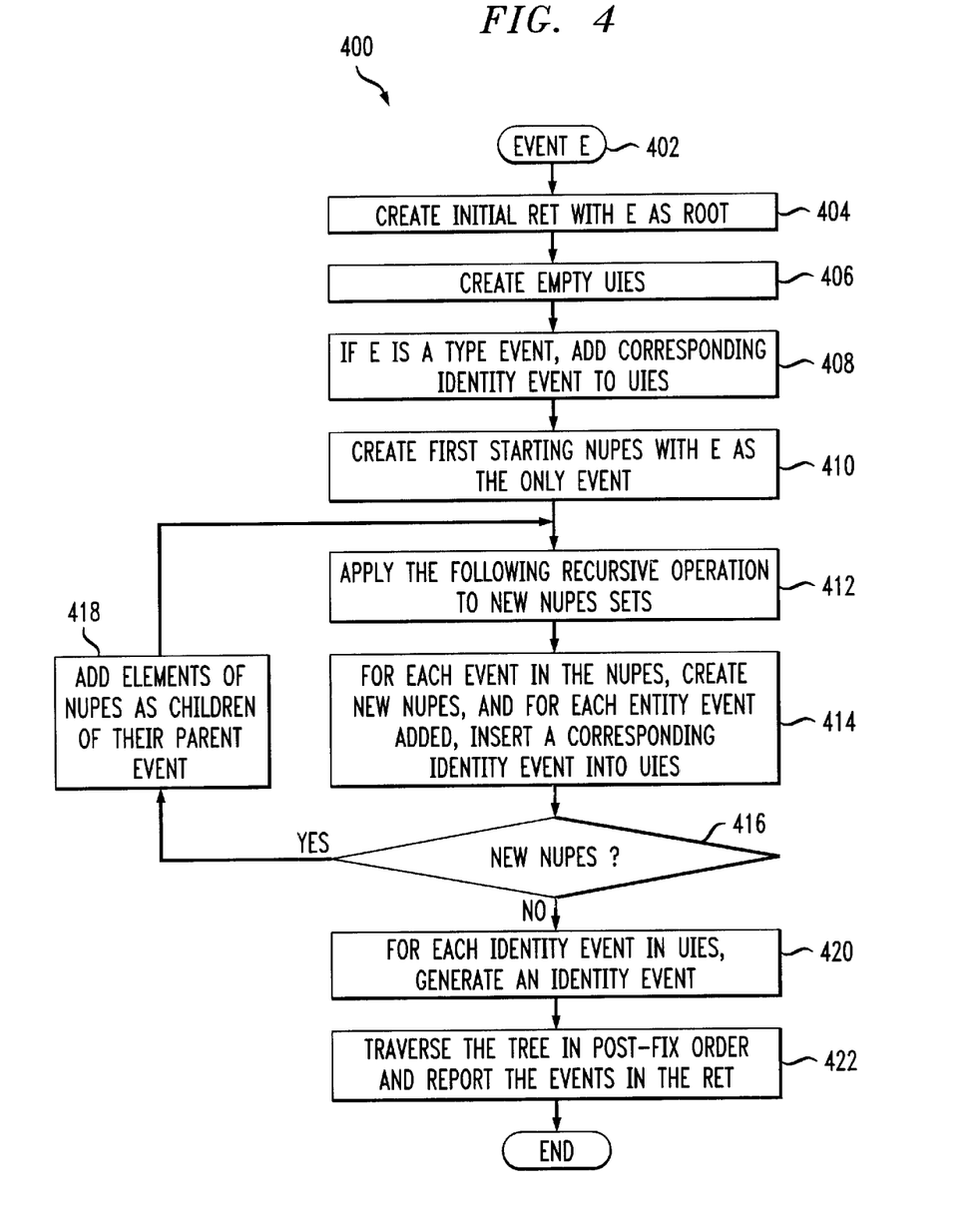
FIG. 4 is a flow diagram illustrating a report event tree generation methodology according to one embodiment of the invention.

The above description of an RET generation methodology is depicted in the flowchart of FIG. 4. First, in the RET generation methodology 400, the initial report event tree is created with the given event E (402) as the root (step 404). An empty UIES is created (step 406). If the event is an entity type event, its identity event is added to the UIES (step 408). Then, only those events of UPES that are not in UIES are identified. We call this subset a Non-redundant UPES (NUPES). We create a starting NUPES with E as the only event (step 410) and apply a recursive operation (steps 412–418) to NUPES to generate the RET.

For each event in a NUPES, we create its new NUPES. In addition, for each type related even t in this set, a corresponding identity event is added to UIES (step 414). The events in the NUPES then become the children of the RET (step 418). Then, the generation process is recursively applied to generate the RET until no new NUPES are created (step 416).

At this point, the RET and UIES are complete and ready to be used for report generation. First, the UIES is processed (step 420). All the identity events in the UIES are reported. Then the RET is traversed in a left-to-right-post-fix order for the generation of the events (step 422). The concept of tree traversal in a left-to-right post-fix order is well known in the art of data structures and tree algorithms. For the example in FIG. 3, first the identity events for T1, T2 and T3 are generated followed by entity creation events for T2, T3 and then T1 in that order.

Given the above concepts, data structures and the sub-algorithm for RET generation, we now refer to FIG. 5 which illustrates an embodiment of a complete generic algorithm 500 for consistent generation of monitoring events according to the invention. When an event is generated by the program execution environment, it is delivered to the monitoring subsystem (agent). The monitoring subsystem performs generic bookkeeping, as described previously (step 504). Then the event 502 is checked to determine if it is in selection (step 506). Depending on the richness allowed in the filtering criteria, it could be as simple as checking a flag on the event-type or it could be a complex function that takes as input the event information and returns a true or false verdict.

If the event is in selection, then the event is handed over the RET generation module (of the monitoring agent) which performs the steps as described in FIG. 4 and the events are reported (step 508). Further, for each reported event, if it happens to be an activity-end event or an entity reclamation event, the corresponding activity-begin events and entity creation events are removed from the RABS and RECS, respectively (step 510). Such a removal allows for recycling of identifiers. That concludes the processing of the event.

If the event is not in current selection (step 506), we check if it still needs to be reported for maintaining event generation consistency. An event needs to be reported if its an activity-end (e.g., method-leave) event or an entity reclamation event (step 512) and the corresponding activity-begin (e.g., method-enter) event or entity creation event is a member of the RABS or RECS, respectively (step 516). If it needs to be reported (step 512 and step 516 succeed), then the event is reported and the corresponding activity-begin event or entity creation event is removed for the RABS or RECS, respectively (step 518). Such a removal allows for recycling of identifiers. If the event is determined not to be an activity-end or entity reclamation event, this is noted to event specific bookkeeping (step 514). This concludes the processing of the event.

If the event is not in current selection, its an activity-end or entity reclamation event and it need not be reported according to the above conditions (step 512 succeeds but step 516 fails), then the event is silently ignored.

However, if the event is not in current selection but its an activity-begin or entity creation event (step 512 fails), then the monitoring agent might have to do some event-specific bookkeeping, as described previously. This is necessary to ensure monitoring consistency in case of dynamic changes in filtering criteria that result in its related events becoming part of the new selection. This concludes the processing of the event.

Figure 6:
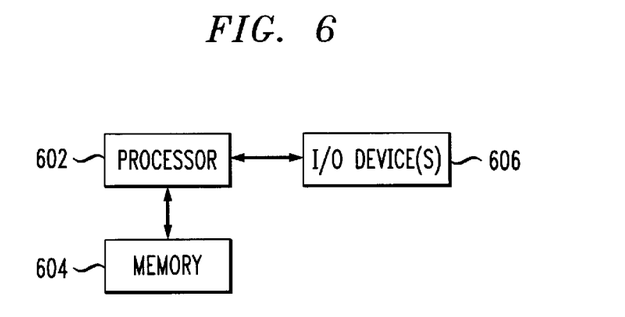
FIG. 6 is a block diagram illustrating an exemplary computer system for implementing the invention.

Referring now to FIG. 6, a block diagram illustrating an exemplary computer system for implementing this invention is shown. The computer system may comprise a processor 602 operatively coupled to memory 604 and I/O devices 606. It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for inputting data to the processing unit, and/or one or more output devices, e.g., CRT display and/or printer, for presenting results associated with the processing unit. It is also to be understood that "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Thus, in accordance with this exemplary implementation, it is to be understood that one or more of the elements shown in FIG. 1 may be implemented on a computer system as illustrated in FIG. 6.

While we have explained the methodologies of the invention generally for application to a large class of problems, it is to be appreciated that one need not implement the invention in the same manner as described in the illustrative embodiments. For example, instead of explicitly creating the many sets described, one can extend the object representation supported by a program execution environment to carry additional flags to denote set membership, thus reducing the complexity and performance overheads of set management to simple setting and resetting of flags in objects. Some program execution environments are such that once objects are allocated in memory, their raw memory address remains the same all through the program execution. In such cases, the need for generating new identities for entities is obviated, as well as the memory for storing identities. Further, instead of building a complete RET before generating events, one can do a depth first expansion and reporting of the RET which can reduce space overheads. Further, if the program execution system invokes the monitoring subsystem along different paths for different events, then the context -in which a set of operations is executed is known statically. This feature can be used to eliminate run-time checks for the type of the event generated by the program execution system.

Accordingly, it is to be understood that the methodologies of the invention can be readily applied to the generation of a consistent set of monitoring events in the presence of partial monitoring. Further, the consistency is maintained even when the information subsetting criteria are dynamically changed during program execution. The methodologies are general enough to apply to a large class of systems that can be depicted, in an object-oriented manner, thus not necessarily to just object-oriented systems. We have applied this invention for supporting consistent partial monitoring for programs written in the Java programming language by modifying a version of Java Virtual Machine (JVM). Further, we applied many of the optimizations suggested above.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of monitoring events generated by an object-oriented program, the method comprising the steps of:

monitoring events which describe executed operations associated with the object-oriented program; and applying one or more sequencing rules when reporting a subset of the monitored events, the one or more sequencing rules substantially ensuring consistent reporting of the subset of monitored events;

wherein when the monitoring step appears to be partially or totally disabled from an external perspective, based on previously monitored events, the step of applying one or more sequencing rules may cause one or more events to be reported to preserve consistency.

2. The method of claim 1, wherein monitoring continues when event reporting is at least partially disabled.

3. The method of claim 1, wherein the monitoring step further comprises the step of dividing the monitored events into categories.

4. The method of claim 3, wherein one category includes entity events, an entity event defining an existence status of a given entity.

5. The method of claim 4, wherein another category includes activity events, an activity event defining an operation associated with a given entity.

6. The method of claim 5, wherein the entity events and activity events are further divided into at least one of an object event category, an execution event category, a type event category and a synchronization event category.

7. The method of claim 5, wherein the one or more sequencing rules substantially ensure consistency associated with an object event.

8. The method of claim 5, wherein the one or more sequencing rules substantially ensure consistency associated with an execution event.

9. The method of claim 5, wherein the one or more sequencing rules substantially ensure consistency associated with a type event.

10. The method of claim 5, wherein the one or more sequencing rules substantially ensure consistency associated with a synchronization event.

11. The method of claim 5, wherein one of the sequencing rules is that an entity event reporting creation of an entity precede an event reporting reclamation of the entity.

12. The method of claim 5, wherein one of the sequencing rules is that an activity event referring to an entity appear between respective entity events reporting creation and reclamation of the entity.

13. The method of claim 5, wherein one of the sequencing rules is that an entity is not reclaimed without reporting its reclamation.

14. The method of claim 5, wherein one of the sequencing rules is that an invocation is not reported without its associated parent being reported.

15. The method of claim 5, wherein one of the sequencing rules is that synchronization events maintain correct semantics.

16. The method of claim 1, wherein the monitoring step includes monitoring events generated in association with the object-oriented program, as the program is executed by an object-oriented system.

17. The method of claim 1, wherein determination of the subset of the monitored events to be reported is made using one of a dynamic and static criterion.

18. The method of claim 1, further comprising the step of determining a subset of monitored events to be logged and reported, wherein the determination of the subset of the monitored events to be logged and reported is made using one of dynamic, static and consistency criterion, where the consistency criterion overrides the subsets specified by the dynamic criterion and the static criterion.

19. Apparatus for monitoring events generated by an object-oriented program, the apparatus comprising:

at least one processor operative to: (i) monitor events which describe executed operations associated with the object-oriented program; and (ii) apply one or more sequencing rules when reporting a subset of the monitored events, the one or more sequencing rules substantially ensuring consistent reporting of the subset of monitored events; wherein when the monitoring operation appears to be partially or totally disabled from an external perspective, based on previously monitored events, the operation of applying one or more sequencing rules may cause one or more events to be reported to preserve consistency.

20. The apparatus of claim 19, wherein the monitoring operation continues when event reporting is at least partially disabled.

21. The apparatus of claim 19, wherein the monitoring operation further comprises dividing the monitored events into categories.

22. The apparatus of claim 21, wherein one category includes entity events, an entity event defining an existence status of a given entity.

23. The apparatus of claim 22, wherein another category includes activity events, an activity event defining an operation associated with a given entity.

24. The apparatus of claim 23, wherein the entity events and activity events are further divided into at least one of an object event category, an execution event category, a type event category and a synchronization event category.

25. An article of manufacture for monitoring events generated by an object-oriented program, comprising a machine readable medium containing one or more programs which when executed implement the steps of:

monitoring events which describe executed operations associated with the object-oriented program; and applying one or more sequencing rules when reporting a subset of the monitored events, the one or more sequencing rules substantially ensuring consistent reporting of the subset of monitored events;

wherein when the monitoring step appears to be partially or totally disabled from an external perspective, based on previously monitored events, the step of applying one or more sequencing rules may cause one or more events to be reported to preserve consistency.

26. A computer program product for monitoring events generated by an object-oriented program, the computer program product comprising:

first instruction means for monitoring events which describe executed operations associated with the object-oriented program; and second instruction means for applying one or more sequencing rules when reporting a subset of the monitored events, the one or more sequencing rules substantially ensuring consistent reporting of the subset of monitored events;

wherein when the first instruction means for monitoring appears to be partially or totally disabled from an external perspective, based on previously monitored events, the second instruction means for applying one or more sequencing rules may cause one or more events to be reported to preserve consistency.

* * * * *